March 24, 1970 C. T. WESTERLUND ET AL 3,502,817

MULTI-EXCHANGE CONFERENCE CIRCUIT WITH REMOTE ADD-ON

Filed Aug. 5, 1966 3 Sheets-Sheet 1

INVENTORS
C.T. WESTERLUND
J.J. ALBERT
M. LEVINE

ATTORNEY

MULTI-EXCHANGE CONFERENCE CIRCUIT WITH REMOTE ADD-ON

Filed Aug. 5, 1966 3 Sheets-Sheet 2

MULTI-EXCHANGE CONFERENCE CIRCUIT WITH REMOTE ADD-ON

Filed Aug. 5, 1966

3,502,817

MULTI-EXCHANGE CONFERENCE CIRCUIT WITH REMOTE ADD-ON

Charles T. Westerlund, Chicago, Ill., and John J. Albert, Kearny, and Michael Levine, West New York, N.J., assignors to International Telephone and Telegraph Corporation, a corporation of Delaware Filed Aug. 5, 1966, Ser. No. 570,591
Int. Cl. H04m 3/56
U.S. Cl. 179—18 6 Claims

ABSTRACT OF THE DISCLOSURE

A conference circuit for use with crosspoint switching networks. The conference circuit provides a way of joining a large number of widely scattered subscribers in a conference call using paths for voice and data equipment without requiring more than one trunk between any two locations. An operator sends signals to effect add-on conference connections at remote offices.

This invention relates to conference call circuits for use in telephone systems and more particularly to circuits wherein stations serving the conferees are added on to the conference, one-at-a-time as they are required.

Usually, conference call circuits utilize bridge or electronic devices which maintain electrical balances while any number (up to the allowable number of stations) are added into the conference circuit. Generally, these conference call circuits are associated with a particular communication center or telephone office and are limited to a connection with stations in that center. Conversely stated, these conference call circuits are not designed to interconnect subscriber stations when such stations are located in different geographical areas or telephone offices which are some distance from each other. Heretofore, either each distant subscriber station has been connected into a conference circuits via its own trunk line or else it has required the special attention of an operator in each of the distant offices.

Modern switching systems have been expanding rapidly to become nation-wide. By way of example, such expansion has included nation-wide direct distance dialing, wide area service, etc. Sometimes these national systems are owned by companies or organizations which transmit along private right-of-ways such as railroads, highways, and pipelines. Among other things, the enlarged geographical scope of such systems and the general increase in business use of telephone systems has created an increased demand for conference calls involving subscribers at widely scattered locations. For example, a single conference call could include people who are located in Vancouver, Toronto, Montreal, and Quebec. One recently developed system capable of giving such a widespread service is shown in a co-pending application entitled, "Automatic Switching Circuit," Ser. No. 500,381, filed Oct. 21, 1965, by J. E. Cox et al., and assigned to the assignee of this invention. Reference may be had to that application, and to other applications cross-referenced therein, for a more complete disclosure of certain portions of the system shown herein.

Accordingly, an object of this invention is to provide new and improved conference call circuits. A more particular object is to provide conference call circuits capable of interconnecting a plurality of widely scattered subscriber stations. Furthermore, an object is to provide means for connecting these lines into the conference circuit by adding them on one at a time, when they are required.

Another object of the invention is to provide for conferencing widely scattered subscriber stations without requiring more than one trunk line, per conference call, extending between any two offices.

In keeping with one aspect of the invention, these and other objects are accomplished by means of separate conference bridges, each bridge being located at a different one of many widely scattered geographical areas. A number of line circuits are connected to each of these bridges in a manner which maintains the conference balance regardless of the number of conferee lines added to the bridge, up to the allowable maximum number of lines.

To set up a conference, an operator uses automatic switches to connect each conferee to an individually associated line circuit in the conference bridge. If the conferees are located at different offices in scattered geographical areas, the operator uses the automatic switches to connect a trunk line between conference bridge line circuits in the two offices. Thereafter, the operator may gain access to the automatic switching equipment at the distant office and complete the setting up of the conference by adding on the conferees. If still more offices are involved, the operator may seize them in the same manner, either directly or in tandem.

The above mentioned and other features and objects of this invention and the manner of obtaining them will become more apparent, and the invention itself will be best understood by reference to the following description of an embodiment of the invention taken in conjunction with the accompanying drawings, in which.

Figure 1:
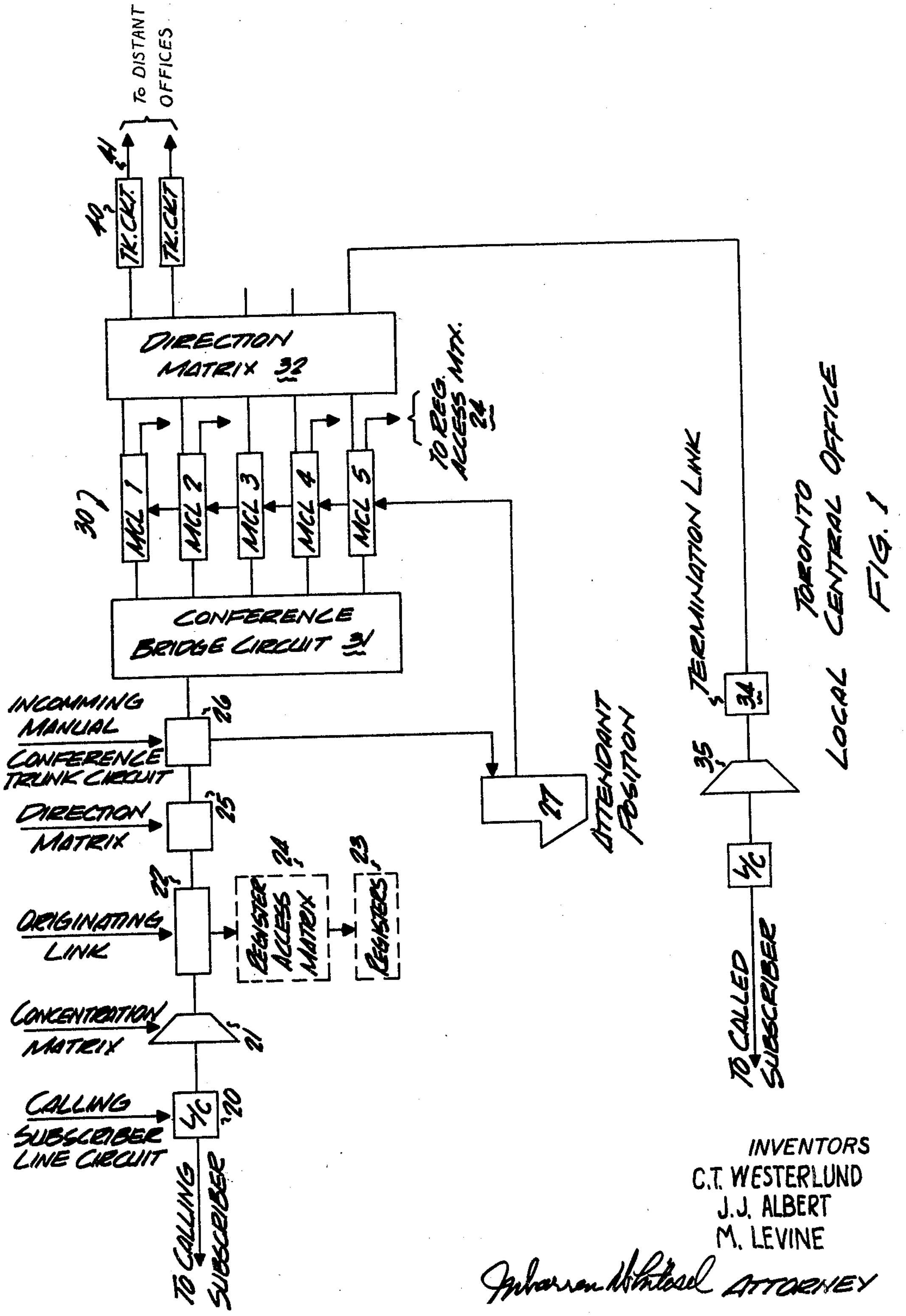
FIGS. 1 and 2 are block diagrams showing how a telephone system may be designed to incorporate the principles of the invention.
Figures 2, 3:
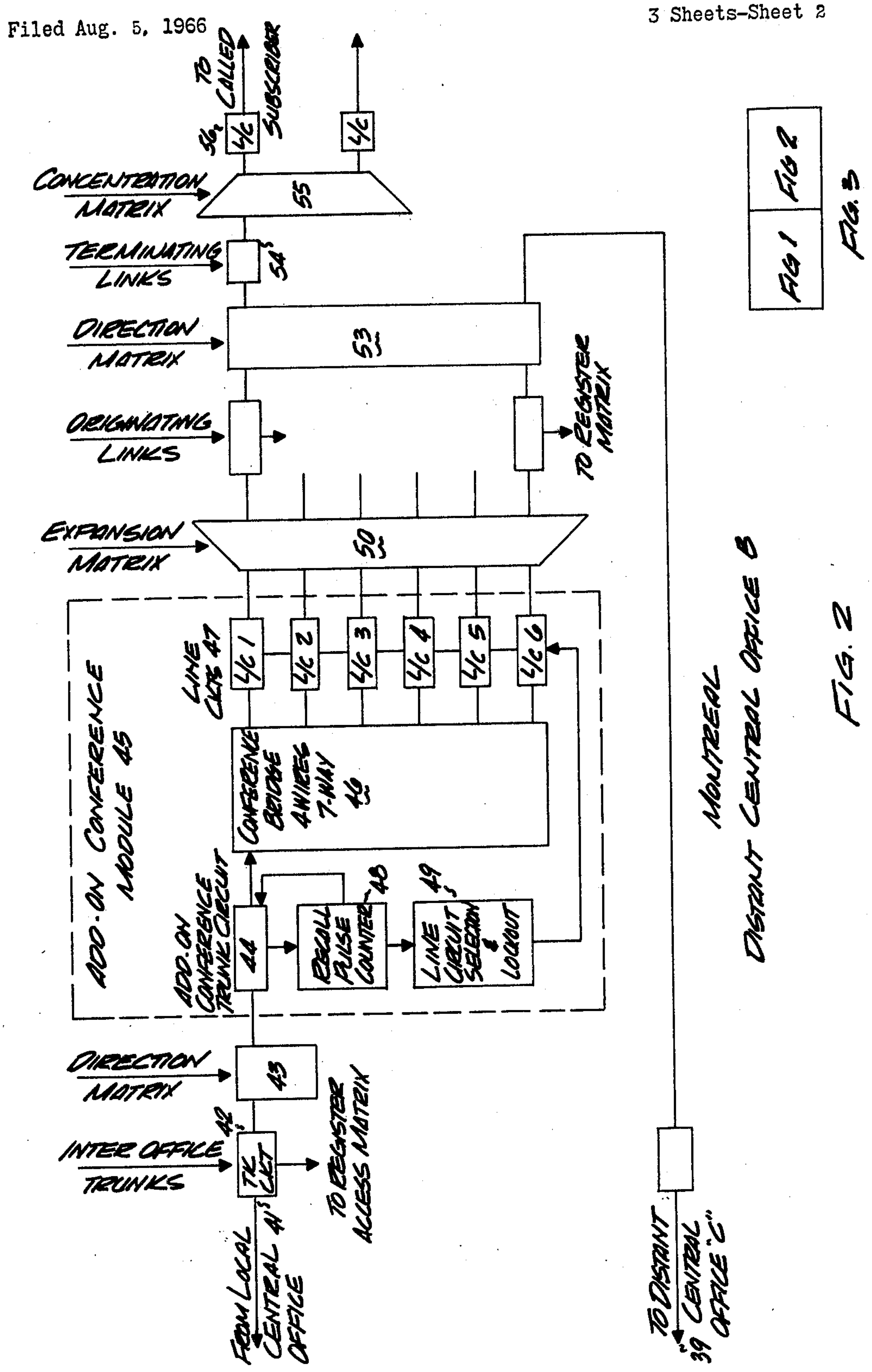
FIG. 3 shows how FIGS. 1 and 2 should be joined to provide a complete and understandable circuit.

Two exemplary ones of many widely scattered offices are shown in FIGS. 1 and 2. To emphasize the distance between these locations, one office is labeled "Toronto" and the other "Montreal," since the described equipment has actually been installed in these particular cities. However, the equipment has also been installed in other cities, and the invention is not to be construed as necessarily limited by the characteristics of transmission between Montreal and Toronto.

The Toronto office (FIG. 1) has been selected to be described as the local office where the operator controls switches to set up the call. Here, an exemplary one of many subscriber line circuits 20 is connected to the line side of a concentration switching matrix 21, which may be constructed as shown in the above identified Cox et al. application. The concentration matrix 21 has access to a control link 22 which controls the establishment and supervision of a switch path. The link 22 has access to a register 23 via an auxiliary register access matrix 24. After a subscriber station goes off hook, it is automatically connected through circuits 20–24, and the register returns dial tone.

Digital signals incoming from the subscriber line 20 are stored in the register 23 and then used to control automatic switches, here shown as a direction matrix 25. If these digital signals indicate that a conference call is required, the directional matrix 25 seizes an incoming manual conference trunk circuit 26 which leads directly into an operator position 27. The operator talks to the calling subscriber and then sets up the conference circuit. Any suitable class of service equipment (not shown) may be used to enable or restrict subscriber access to the conference equipment.

After the operator at the position 27 has talked to the calling subscriber and learned about the need for conference and the identity of the other subscribers who are to be conferees, she controls a number of outgoing manual conference line or trunk circuits 30. Each of the line or trunk circuits 30 is used to connect a single conferee station to the conference bridge 31.

Each time that the operator 27 seizes one of the manual conference line circuits 30, it applies to the register access matrix 24 for a connection to an idle register. The register then receives the operator sent digits and thereafter controls a direction matrix 32 to seize a called subscriber station (such as 33) via a termination link 34 and concentration matrix 35. This particular drawing shows separate concentration and direction matrices 21, 25, 32, 35 to facilitate the description. However, in reality, the two concentration matrices 21, 35 may be the same concentration network, and the two direction matrices 25, 32 may also be the same direction network.

Each time that the operator 27 dials, she operates the automatic switches to connect a subscriber station into the bridge circuit 31. Then, she tells the called subscriber that she is setting up a conference call and asks him to wait. She thereafter proceeds to add-on the next subscriber station to the conference bridge. After all subscriber stations have been connected into the conference bridge, the operator 27 disconnects and conversation follows:

Next, assume that the calling subscriber requests a conference involving subscribers who are located at many different offices in widely scattered locations. Generically, the drawing shows these locations as offices A, B, and C. For direct access to a distant office, the operator may use one of the two trunk lines 40. A trunk line 39 in FIG. 2 is marked "To Distant Office C" to signify a tandem access from office A.

To complete an inter-office conference call from the local office A, the operator first seizes one of the outgoing manual conference line circuits 30 and then dials a directory number identifying the conference bridge in office B. This completes a circuit through the direction network 32 to an outgoing trunk circuit 40 and over a trunk line 41 to a trunk circuit 42 in the distant office B. That trunk circuit seizes a register via an access matrix and operates the local automatic switches, again shown as a direction network 43. Responsive thereto, the call is extended to a trunk circuit 44 of an add-on conference module 45.

The incoming trunk circuit 44 in the add-on conference module 45 is connected to one input of a conference bride circuit 46. A number of line circuits 47 are also connected to the bridge 46 by a sequencing arranged such that the bridge remains balanced as any number of lines (up to the allowable limit) are added into the conference bridge. Each one of the line circuits 47 allows one line to be added to the bridge.

In keeping with the invention, the operator 27 first seizes the add-on conference module 45, and she gets dial tone. Then, she dials the directory number of the first wanted subscriber station. To add-on additional stations, she sends line loop interruption signals by pushing her recall key twice. Responsive thereto, she gets dial tone, and dials the next wanted number. After all conferees are connected together, she pushes her recall key once to send a single line loop interruption and then she leaves the conference circuit. Thereafter, the conference continues until the subscribers hang up.

In greater detail, each double operation of the recall key causes a selected one of the line circuits 47 to complete a connection through an expansion matrix 50, responsive to the line selection and lock out circuit 49, to seize an originating link such as 51. The originating link, in turn, seizes a register (not shown in FIG. 2) via an access matrix. The register returns dial tone, and the calling operator dials the directory numbers of a called line. The register in office B sets automatic switches (a direction matrix 53) to seize a local called subscriber line 56 via a terminating link 54 and a concentration matrix 55. Any number of other called lines may be added-on in the same manner. Or, if the operator 27 dials a directory number which identifies a distant office C, one of the line circuits 47 is connected through the networks 50, 53 to the outgoing trunk circuit 57. Then, another add-on conference module circuit, such as 45, is seized in the distant office C, and the process is repeated there.

Figure 4:
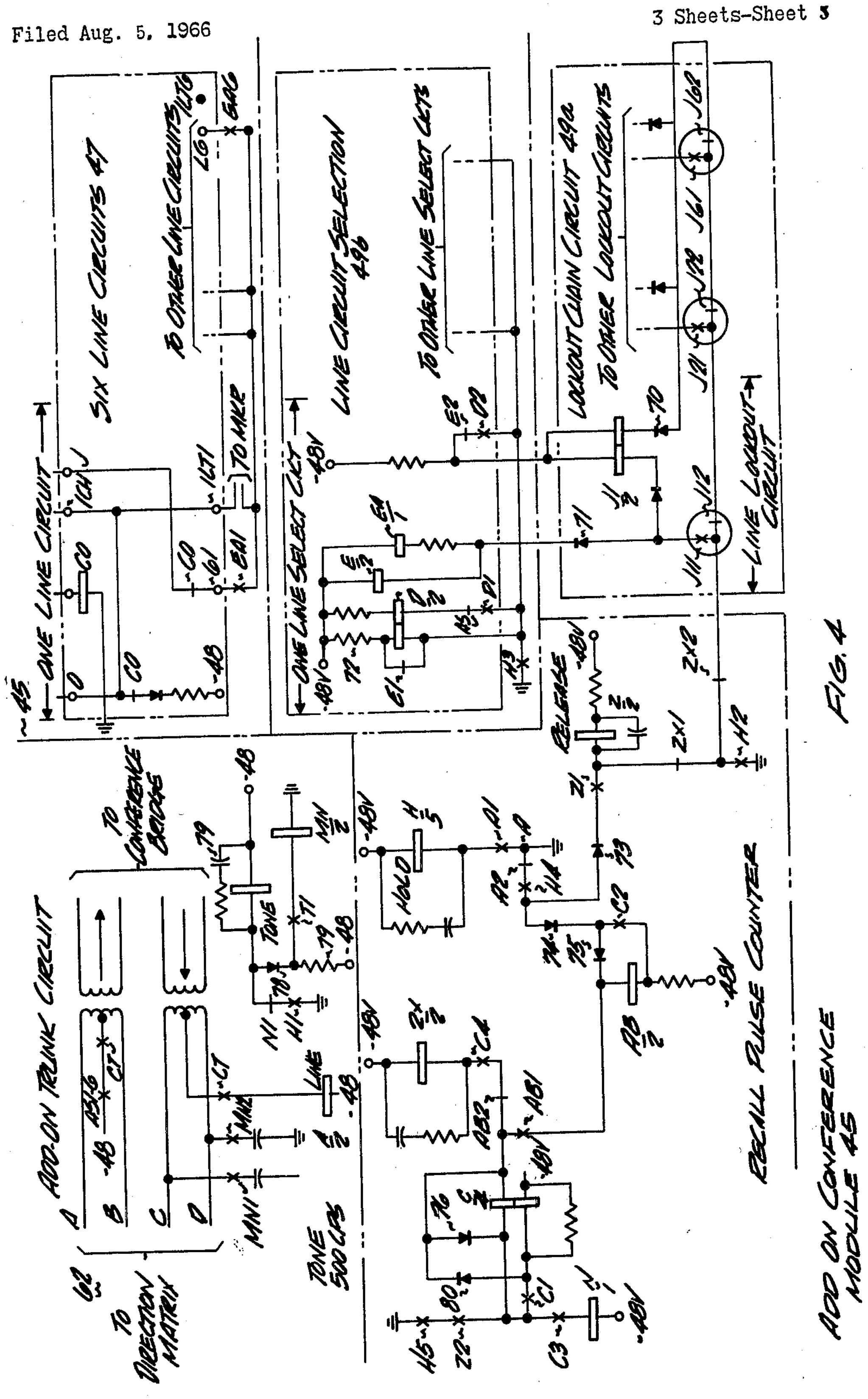
FIG. 4 is a schematic circuit diagram showing the pertinent parts of the circuitry required to complete the corresponding blocks in FIGS. 1 and 2 for providing the add-on conference network.

The detailed nature of the add-on conference module circuit will become more apparent from a study of FIG. 4. In this drawing, dot-dashed lines are used to separate the circuit into the parts which correspond to the blocks of FIG. 2. The relationship between these two drawings should become apparent from a visual inspection and comparison thereof.

Only the parts necessary for an understanding of the invention are shown here. Those skilled in the art will readily perceive how these parts may be fitted into almost any system. The lockout chain **49*a* shows one of six lockout relays, here called "J relays." The contacts J21, J22 . . . J61, J62 represent the other five lockout relays, each of which is identical to relay J1. Likewise, one of six line selection circuits is shown at 49*b* as having three relays D, E and EA with associated contacts. Five other identical circuits (not shown) are also in the box 49*b*. Finally, the pertinent parts of a single line circuit are shown in the box 47. Five other, similar line circuits (not shown) are also included in this box 47**.

The four-wire trunk line 41 (FIG. 2) extending between the offices A and B is connected through a trunk circuit 42 and direction matrix 43 to the access point 62 (FIG. 4). A well known cut-through relay (not shown) operates relay contacts CT when a connection is completed into circuit 45, and it is ready to respond. Relay A operates over the path including contacts CT and closes the contacts A1 to operate a slow release hold relay H. Contacts A2 open without effect at this time.

When relay H operates, contacts H1 close to operate a tone relay T and shunt a tone cut-off relay MN without immediate effect. Contacts H2 close to operate a release relay Z via contacts ZX1 and to send a ground signal through contacts ZX2, J12, J22 . . . J62 and a diode (such as 70) to each of the J relays. The fastest one of the J relays operates first and opens its "2" contact to lock-out the others. For example, if relay J1 operates first, contacts J12 open to lock-out the remaining J relays, not shown. The contacts J11 close a circuit through diode 71 to operate relays E and EA in the corresponding line select circuit **49*b***.

When relay E operates and contacts E1 open, a short circuit is broken around the left-hand winding of relay D. Since hold relay H is operated, current flows from ground through contacts H3, the left-hand winding on relay D, and resistor 72 to a (−) 48 volt battery. Relay D operates and, without immediate effect, closes a number of circuits in preparation for answer supervision.

Responsive to the operation of the relay EA, contacts EA1 close to transmit a demand from the selected line circuit to a marker (not shown). The marker responds to this demand by seizing the line circuit identified by the closed contacts EA1.

Dial tone is returned to the operator 27 who then dials the directory number of the first conferee line. The register receives the dialed number and causes the local automatic switching equipment to complete the indicated connection in any normal manner. If the line is busy or the called party does not answer, the operator 25 releases with the usual disconnect effects.

When the called party answers, an answer supervision relay (not shown) operates in any suitable and known manner to close contacts AS. Since relay D is standing in an operated condition at this time, the contacts D1 are closed and relay D is held operated via its right-hand winding for the duration of the call. When the call is over, the calling subscriber hangs up, and contacts AS open to release relay D and restore the line selection circuit 49b to normal.

As soon as the called party answers, the operator talks to him and asks him to wait until the conference call is established. Then, she pushes her recall key twice to set up the next connection. Each operation of this key opens and closes the circuit to relay A, and it releases to send a line loop interruption for a period of 60–120 ms. and then it reoperates.

Responsive to the first recall signal, the relay A drops for the 60–120 ms. line loop interruption period, the contacts A1 open, but relay H has slow release characteristics and it remains operated over this period. With relay A released and relay H operated, a circuit is completed from ground through the contacts A2, H4, diode 73 and contacts Z1 to hold the release relay Z. This same ground is also applied through diodes 74, 75, and winding of relay AB to a (—) 48 volt battery. Relay AB operates and closes contacts AB1 while opening contacts AB2; however, relay C does not operate at this time because its upper winding is short-circuited to ground through the diode 76 and contacts Z2, H5.

At the end of the first recall pulse, relay A reoperates, and contacts A1 close to reenergize the hold relay H. Contacts A2 open and remove the shunting ground potential applied through diode 76 so that relay C operates and relay AB holds via the path traced from ground and including the contacts H5, Z2, the upper winding of relay C, contacts AB1, and the winding of relay AB to (—) 48 v. Contacts C1 close to lock relay C to the same ground via contacts H5, Z2. Contacts C2 close to prepare a shunt release path for relay AB. Contacts C3 close to operate relay N from the ground potential applied through the contacts H5, Z2.

Relay N opens contacts N1 and removes a shunt circuit which had been applied from ground through diode 78 and the winding of the relay MN to ground. Therefore, relay MN operates over a circuit traced from a (—) 48 v. battery through resistor 79, contacts T1 and the winding of relay MN to ground. Contacts MN1 and MN2 close to send tone to the operator and thereby indicate to her the successful connection of the first conferee to the bridge circuit 46. Relays T and MN are held operated during a period while capacitor 79 discharges. Then, relay T releases, contacts T1 open, relay MN releases, contacts MN1 and MN2 open, and tone is removed from the line 62.

The operator responds to the tone by pushing her recall key a second time if she wants to add another line to the conference bridge. The line relay A drops for another 60–120 ms. line loop interruption period. Ground is applied through the contacts A2, H4, diode 74, and contacts C2 to shunt relay AB which releases. The contacts AB2 close, and relay ZX operates over a circuit including contacts C4, AB2, the diode 80 and contacts C1, Z2, and H5 to ground.

Contacts ZX2 open to drop the J, E, and EA relays which had operated previously. If the called party answered so that answer supervision contacts AS are closed, relay D is held operated from the ground at contacts H3. This same ground potential is also applied through contacts H3, D2, and E2 to the upper side of the winding of relay J1 to shunt it and also prevent it from operating at a later time during this particular conference call.

At the end of the recall pulse, line relay A reoperates. When the contacts A2 open, relay Z releases since contacts ZX1 are now open. The contacts Z2 open to release the relays N, C, and ZX. The contacts ZX2 close a circuit from ground at contacts H2 to the J relays, and the fastest one operates if it is not then shunted through contacts D2, E2. If it is so shunted, the next fastest J relay operates.

The operation of a J relay is followed by the events described above, and another line circuit is taken into use.

The process is repeated as often as required until all of the required conferees have been connected into the bridge 46.

The conference call may now be held as if all subscribers were connected to a single bridge. After the call is completed the conference may be released in a manner which should be apparent to those skilled in the art.

The advantages will be apparent to those skilled in the art. Chief among these advantages is a savings of trunk lines for inter-office conference calls.

While the principles of the invention have been described above in connection with specific apparatus and applications, it is to be understood that this description is made only by way of example and not as a limitation on the scope of the invention.

What is claimed is:

1. A switching system comprising a plurality of central offices at widely scattered locations, each of said offices having automatic switching equipment thereat, conference circuit means at each of said offices for selectively interconnecting a plurality of conferees located at said office, means responsive to signals from one of said offices for operating the switching equipment to selectively connect individual ones of said plurality of conferees at each of a number of different ones of the offices to the conference circuit means in the offices where the individual conferees are located, and means for interconnecting the conference circuit means at said different offices to form a single distributed conference circuit including all of said conferees.

2. The switching system of claim 1 and a plurality of individual line circuits associated with each of said conference circuit means, means for utilizing each of said individual line circuits to connect one conferee to said conference circuit means, and means for utilizing any one of said individual circuits for connecting a conference circuit means to a trunk leading to another conference circuit means in a distant office.

3. The switching system of claim 2 and means for connecting said individual line circuits into said conference circuit means in an order which maintains the balance of said conference circuit means regardless of the number of said individual line circuits connected to said conference circuit up to the allowable maximum number of conferees served by said conference circuit means.

4. The switching system of claim 1 and an operator position associated with the conference circuit means in at least one of said offices, and means associated with said operator position for controlling the automatic switching equipment at each of said offices.

5. The switching system of claim 4 and means whereby an operator at said position may add on a new conferee to an existing conference circuit, said added on conferee being located in any of said distance offices.

6. The switching system of claim 1 and means responsive to two successive line loop interruption signals for seizing said automatic equipment to add on said conferee.

References Cited

UNITED STATES PATENTS

| | | | |
|---|---|---|---|
| 3,210,476 | 10/1965 | Shaer | 179—18 |
| 3,170,042 | 2/1965 | Giroud | 179—18 |
| 3,231,678 | 1/1966 | Ward et al. | 179—18 |
| 3,144,517 | 9/1964 | Albrecht | 179—18 |

WILLIAM C. COOPER, Primary Examiner

T. W. BROWN, Assistant Examiner

U.S. Cl. X.R.

179—27